(12) United States Patent
Hoffman et al.

(10) Patent No.: US 9,243,971 B2
(45) Date of Patent: Jan. 26, 2016

(54) MONITORING FLUID FLOW IN A CONDUIT

(75) Inventors: Andrew Hoffman, Lancashire (GB); Jun Zhang, Lancashire (GB)

(73) Assignee: Atmos Wave Limited (GB)

( * ) Notice: Subject to any disclaimer, the term of this patent is extended or adjusted under 35 U.S.C. 154(b) by 863 days.

(21) Appl. No.: 13/515,113

(22) PCT Filed: Nov. 24, 2010

(86) PCT No.: PCT/GB2010/051955
§ 371 (c)(1),
(2), (4) Date: Aug. 29, 2012

(87) PCT Pub. No.: WO2011/070343
PCT Pub. Date: Jun. 16, 2011

(65) Prior Publication Data
US 2013/0199273 A1 Aug. 8, 2013

(30) Foreign Application Priority Data
Dec. 9, 2009 (GB) .................................. 0921530.2

(51) Int. Cl.
G01F 17/00 (2006.01)
G01M 3/28 (2006.01)
F17D 5/04 (2006.01)
G01F 1/712 (2006.01)
G01F 1/74 (2006.01)
G01F 1/34 (2006.01)
G01F 23/00 (2006.01)

(52) U.S. Cl.
CPC ............... *G01M 3/2807* (2013.01); *F17D 5/04* (2013.01); *G01F 1/34* (2013.01); *G01F 1/712* (2013.01); *G01F 1/74* (2013.01); *G01M 3/2815* (2013.01)

(58) Field of Classification Search
CPC ........................................................ G01F 1/74
See application file for complete search history.

(56) References Cited

U.S. PATENT DOCUMENTS

| 5,272,646 A | 12/1993 | Farmer |
| 7,454,981 B2 | 11/2008 | Gysling |
| 2004/0199340 A1* | 10/2004 | Kersey et al. ................... 702/50 |
| 2005/0005713 A1 | 1/2005 | Winston et al. |
| 2009/0018782 A1 | 1/2009 | Sameda et al. |

FOREIGN PATENT DOCUMENTS

WO 93/20411 10/1993

* cited by examiner

*Primary Examiner* — Phuong Huynh
(74) *Attorney, Agent, or Firm* — Salter & Michaelson

(57) ABSTRACT

According to the present invention, there is provided a method of monitoring a fluid in a fluid carrying conduit comprising the steps of: monitoring a fluid characteristic at a first point and second point along the conduit substantially continuously; determining first and second quantities, being related to a differential with respect to time of the value of the fluid characteristic at the first and second points respectively; combining the first and second quantities to produce a two dimensional intensity function of time and a position variable and analyzing the magnitude of the intensity function to derive information relating to the fluid. The intensity function may represent a substantially continuous probability function, wherein its absolute value is related to the probability of a leak or theft having occurred in the conduit. Furthermore, a method of determining the presence and location of leaks in, or thefts from, the conduit by determining whether or not the magnitude of the intensity function satisfies pre-determined criteria is disclosed. A method of determining the speed of pressure waves propagating through a fluid flowing in a fluid carrying conduit by analyzing the two dimensional intensity function is also disclosed. An apparatus suitable for performing all of the above mentioned methods is also claimed.

18 Claims, 10 Drawing Sheets

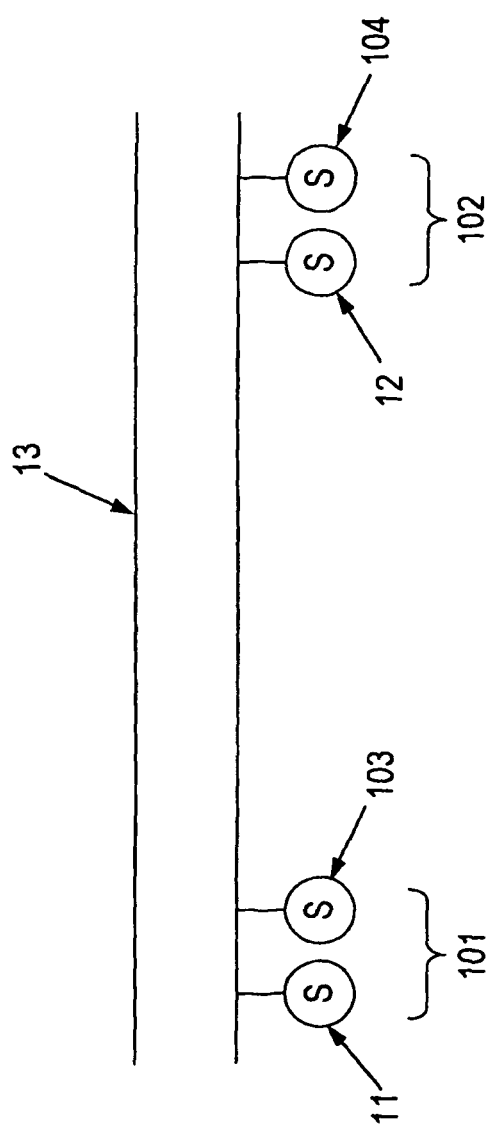

MONITORING FLUID FLOW IN A CONDUIT

TECHNICAL FIELD

The present invention relates to monitoring fluid flow in a conduit and, in particular, to the detection and location of fluid leaks in, or thefts from, the conduit. In particular, and for the avoidance of doubt, the present invention relates to the monitoring of the flow of liquid and/or gas in a pipeline.

BACKGROUND OF THE INVENTION

It is often necessary to convey fluids such as water and oil over large distances and, as such, these fluids often flow under pressure through a dedicated system of pipes. Such pipes are susceptible to leaks and it is vital that such leaks are identified and located as soon as possible to avoid excessive fluid loss and further damage to the pipe. However, typically, at least part of these systems is inaccessible being situated, for example, under ground. Therefore there is a need for a method of monitoring the fluid flow in such pipes which will allow for easy determination, and accurate location, of leaks.

When a leak occurs in a conduit carrying fluid under pressure, there will be a pressure loss at the point of the leak and a pressure wave will propagate from that point in both directions along the pipe. One known method of determining the time of arrival of a pressure wave front propagating through a fluid in a conduit is disclosed in U.S. Pat. No. 5,388,455. The disclosed method involves monitoring the absolute value of the fluid pressure in the conduit at two points. Typically, in the case of steady conditions and no leaks, owing to turbulence in the fluid the pressure measured will not be a constant but will fluctuate about an average value. Once the pressure wave front from a leak reaches the points at which the pressure is being monitored the measured pressure will decrease, although the raw data will continue to be noisy. The method according to the prior art uses a least squares fit in order to determine the point at which the average value of the pressure starts to fall. In principle, by comparing the time at which this occurs at the two points on the conduit, if the speed of propagation of the pressure waves in the fluid is known then, assuming that the source of the measured pressure wave was a leak, the position of said leak can be determined using time of flight information.

However, this method suffers from a number of problems when used to determine the presence and location of leaks. The above mentioned prior art method involves the measurement of a pressure wave front and it must be assumed that the source of said pressure wave was a leak or theft from the pipe. That is to say that other sources of pressure waves, for example, external vibration or banging of the pipe or transient waves from the packing of the pipe, may give rise to false alarms. Furthermore, the method involves the output of discrete events which correspond to wave front arrival at the point at which pressure is monitored.

Another known method uses flow meters to monitor the rate of flow of fluid at set points on the conduit. However, the output of such monitors must be integrated over a suitable time period in order to detect a flow discrepancy. As such, there is necessarily a time delay between the leak occurring and a positive determination that is has occurred.

It is an object of the present invention to at least partially overcome or alleviate the above problems.

SUMMARY OF THE INVENTION

According to a first aspect of the present invention, there is provided a method of monitoring fluid flow in a fluid carrying conduit comprising the steps of: monitoring the fluid pressure at a first point and second point along the conduit substantially continuously; determining first and second quantities, being related to the second differential with respect to time of the fluid pressure at the first and second points respectively; combining the first and second quantities to produce a two dimensional intensity function of time and a position variable, and analysing the magnitude of the intensity function to derive information relating to the fluid flow.

By monitoring the fluid using the method of the first aspect of the present invention, the presence of leaks in the fluid carrying conduit can be discovered. Furthermore, the method of the present invention allows for the location of such a leak to be determined accurately.

Preferably, the first point is chosen to be proximate to a first end of a section of the conduit which it is desirable to monitor, and the second point is chosen to be proximate to the other, second, end of that section of the conduit.

The fluid pressure at the first and second points on the conduit may be monitored substantially continuously by any suitable pressure sensing means. Preferably, a pressure sensing means which results in low noise is chosen. More specifically, the noise may be separated into two categories: ordinary noise which is a result of natural local pressure fluctuation, for example as a result of turbulent fluid flow, and quantisation noise which is a result of the finite rate at which the data is sampled. It is especially desirable to choose a pressure sensing means which results in a low level of quantization noise. In particular, the pressure sensing means may comprise any or all of the following: pressure sensors, microphones and strain gauges.

Preferably, the first and second quantities are proportional to the second differential with respect to time of the fluid pressure at the first and second points respectively. In a preferred embodiment, the first and second quantities are determined using a suitable numerical estimate algorithm.

Preferably, before the second differentials with respect to time of the fluid pressure at the first and second points are determined using the numerical estimate algorithm, the raw data is smoothed. This avoids the complication that the output of numerical estimates of second differentials for noisy input data is typically unreliable.

Preferably, the raw data is smoothed by performing a local time averaging. In a preferred embodiment, a second data set is found from each of the raw data sets, wherein a point in the first data set proportional to the average of h corresponding data points in the raw data set. This second data set is substantially smoother than the raw data and is therefore a more suitable input to the numerical estimate algorithm. In a particularly preferred embodiment, the raw data is sampled at a high rate, for example at a rate of the order of 100 Hz. By choosing a high sampling rate for the raw data, the second data set retains adequate temporal resolution despite the averaging.

Preferably, the position variable corresponds to the displacement of points on the conduit relative to a fixed origin point, that is the displacement possesses both magnitude and direction and, as such, it can be positive or negative. For example, the fixed origin point may be a point on the conduit midway between the first point and the second point. Preferably, the position variable is converted into units of time using the speed of propagation of pressure waves through the fluid in the conduit. By doing this the position variable so formed, p, corresponds to the time of flight of a pressure wave from points on the conduit to the fixed origin point.

The intensity function may be produced by combining the first and second quantities in such a way that correlations between the first and second quantities correspond to local maxima and/or minima of the intensity function.

The first and second quantities, A and B respectively, are functions of time, that is A=A(t) and B=B(t). Preferably, for a fixed value of time, t, and position variable (in units of time), p, the intensity function is found by combining a region of the first quantity centred on t+p with a region of the second quantity centred on t−p. The size of the regions may be chosen to be 2x, where x corresponds to a time greater than the time of flight of a pressure wave propagating from the first point on the conduit to the second point. For example, x may be approximately 125% of the time of flight of a pressure wave propagating from the first point on the conduit to the second point.

In a particularly preferred embodiment, the intensity function is given by:

$$I(t, p) = \sum_{n=p-x}^{n=p+x} A(t-n)B(t+n), \quad (1)$$

where A and B are the first and second quantities respectively, t is the time and p is the position variable in units of time.

The method may further comprise the step of monitoring the fluid pressure at a third point and fourth point along the conduit substantially continuously; determining third and fourth quantities, being related to the second differential with respect to time of the fluid pressure at the third and fourth points respectively; combining the third and fourth quantities to produce a two dimensional intensity function of time and a position variable, and analysing the magnitude of the intensity function to derive information relating to the fluid flow.

This step may incorporate any or all of the features discussed above.

Preferably, the third point is proximate to the first point but displaced by a small finite distance along the conduit relative to the first point; and the fourth point is proximate to the second point but displaced by a small finite distance along the conduit relative to the second point.

According to a second aspect of the present invention, there is provided a method of determining whether or not there is a leak in a fluid carrying conduit comprising the steps of: monitoring the flow of fluid in the conduit using the method of the first aspect of the present invention and determining whether or not the magnitude of the intensity function satisfies pre-determined criteria, wherein if the intensity function does satisfy the pre-determined criteria, a leak is determined to have occurred.

The second aspect of the present invention may incorporate any or all features of the first aspect of the present invention as is desired or appropriate.

This works because the intensity function essentially represents a substantially continuous probability function, wherein its absolute value is related to the probability of a leak having occurred.

The pre-determined criteria may comprise requiring a local minimum or maximum of the intensity function. This may be found by any suitable method, for example using a numerical estimate to find the total differential of the intensity function and requiring this to be below a pre-set threshold value, using an iterative method or by any other method as is desired.

The method of the second aspect of the present invention may further comprise identifying all local maxima and arranging these in ascending order. In such embodiments each of these maxima maybe a potential leak candidate. Preferably, the method further comprises the step of comparing all leak candidates which correspond to a maximum with a pre-set threshold value. The method may further comprise the step of rejecting all candidates corresponding to a maximum which is below the pre-set threshold.

The method may comprise the step of rejecting any leak candidates which correspond to maxima which are close to a larger maximum. In this way for a cluster of adjacent maxima, only the largest is considered. For embodiments comprising this step, two maxima may be determined to be close if the distance between them is smaller than a pre-set threshold. Furthermore, the distance may be a spatial distance, a temporal distance or a distance between the two maxima in the t−p plane or any combination of these as desired and/or required. In a particularly preferred embodiment, the step of rejecting any leak candidates which correspond to maxima which are close to a larger maxima may comprise the sub-steps of: determining whether or not the two peaks are temporally separated by more than a pre-set temporal separation threshold, checking that the ratio of the smaller peak intensity to the larger peak intensity is above a pre-set intensity threshold, and checking that the two peaks are spatially separated by more than a pre-set spatial threshold. In such embodiments the smaller peak is only considered to be a leak candidate if all of these criteria are met. Alternatively, the smaller peak may be considered to be a leak candidate if two of these criteria are met.

The first and second points on the conduit, at which the pressure is monitored substantially continuously, correspond to two lines in the t−p plane in which the intensity function is defined and the central region between those lines corresponds to the continuum of points on the conduit between the first and second points. The method may further comprise the step of rejecting any leak candidates which correspond to maxima lying outside of the central region. This is particularly advantageous as it leads to the rejection of transient waves propagating along the conduit. Therefore, any pressure wave whose source is not between the first and second points, for example as a result of the pipe receiving an external blow, will not lead to false determination of leaks in the conduit.

The method may further comprise the step of rejecting some or all of the candidates which correspond to maxima which are arranged in a straight line in the t−p plane. This rejection may only be applied for arrangements wherein the absolute value of the gradient of the line is substantially the same as the speed of propagation of pressure waves through the fluid. This is particularly advantageous since it allows for rejection of large packing transient waves. A pipeline which carries a fluid may comprise: a pump at one end of the pipeline operable to pump the fluid towards the other end of the pipeline; and a valve at the other end of the pipeline operable to restrict the flow of fluid out of the other end of the pipeline. Therefore, when the pipeline does not contain the desired quantity of the fluid, the pipeline may be 'packed' by operating the pump while closing the valve to restrict the fluid flow out of the pipeline. This will result in an increase in the quantity of fluid inside the pipeline and, therefore, will result in an overall increase in the fluid pressure. Such increases in fluid pressure as a result of packing the pipe, or corresponding decreases in fluid pressure as a result of draining the pipe, can lead to candidates which correspond to maxima which are arranged in a straight line in the t−p plane wherein the absolute value of the gradient of the line is substantially the same as the speed of propagation of pressure waves through the fluid. Therefore by rejecting such leak candidates false alarms may be reduced. Furthermore, it allows for a correct treatment of leaks occurring while the fluid pressure is altered externally.

Preferably, the method further comprises the step of determining the ratio of leak transients. When a leak occurs in the region of the pipeline in between the first point and the second point, a pressure wave will propagate in both directions along the pipeline. As such, there will be a pressure change measured by the two pressure sensing means and corresponding maxima and/or minima in the first and second quantities. If the leak occurs closer to the first point than the second point, one would expect the intensity of the maximum in the first quantity, $I_1$, to be larger than the maximum in the second quantity, $I_2$, and vice versa. Leak candidates result from the combination of a region of the first quantity containing a peak being combined with a region of the second quantity containing another peak. If the attenuation of pressure waves along the pipeline is known, then given the position of a leak candidate, the intensities of the peaks in the first and second quantities from which it was found may be used to reject false leak candidates. This shall be referred to hereinafter as determining the ratio of leak transients. For example, say the distance between the leak and the first point is, $L_1$, and the position between the leak and the second point is, $L_2$, by assuming that the attenuation of pressure waves is a linear function of distance traveled, one would expect the ratio of $I_1 \times L_1$ to $I_2 \times L_2$ to be approximately 1. In a preferred embodiment of the present invention, the step of determining the ratio of leak transients may comprise requiring the ratio of $I_1 \times L_1$ to $I_2 \times L_2$ to be approximately 1.

If the transmission loss of the pipe is known then ghost peaks, which are generated as a result of leaks occurring concurrently with line packing, may be rejected.

The method may further comprise the step of rejecting a group of candidates if they correspond to a group of maxima occurring at substantially the same time. Preferably, such rejection occurs only if the number of peaks occurring at substantially the same time is greater than a pre-determined value. This is particularly advantageous because when the operational conditions of the fluid are altered substantially, false maxima, which do not correspond to leaks, may be generated. Typically these false maxima are generated at substantially the same time.

In embodiments where the fluid pressure at a third point and fourth point along the conduit is measured substantially continuously, the method of the second aspect of the present invention may further comprise the step of comparing the sets of leak candidates found by analysing the intensity function derived from the first and second quantities and the intensity function derived from the third and fourth quantities. Furthermore, the method of the second aspect of the present invention may further comprise the step of rejecting leak candidates unless they are present in both the intensity function derived from the first and second quantities and the intensity function derived from the third and fourth quantities.

Furthermore, the method may further comprise the steps of combining the first and third quantities to produce a two dimensional intensity function of time and a position variable, and analysing the intensity function to determine the direction of propagation of the pressure wave resulting in each leak candidate; and combining the second and fourth quantities to produce a two dimensional intensity function of time and a position variable, and analysing the intensity function to determine the direction of propagation of the pressure wave resulting in each leak candidate. For a leak occurring between the area within which the first and third points are located and the area within which the second and fourth points are located, the direction of the waves at these two areas should be opposite, whereas for a wave propagating along the entire conduit these directions should be the same. This may be used to further discriminate against transient waves propagating along the conduit.

It is particularly difficult to detect the presence of leaks in the case of multiphase flow along the conduit since the velocity of pressure wave propagation can vary by as much as 50%. For such systems, a preferred embodiment does not comprise the step of rejecting leak candidates which correspond to maxima which are close to a larger maximum but does comprise the above mentioned direction discrimination to distinguish between waves originating inside the region of interest and those originating outside. Although the determination of the position of any leaks may be poor, the leaks will nonetheless be detected.

According to a third aspect of the present invention there is provided a method of determining the location of a leak in a fluid carrying conduit comprising the steps of: determining whether or not there is a leak using the method of the second aspect of the present invention and, if a leak is found, identifying the position of the leak by mapping the location of the region of the intensity function which satisfies the pre-determined criteria onto a corresponding position on the conduit.

The third aspect of the present invention may incorporate any or all features of the first and second aspects of the present invention as is desired or appropriate.

According to a fourth aspect of the present invention there is provided an apparatus suitable for performing the method of the first, second or third aspects of the present invention comprising: a first pressure sensing means locatable at the first point, a second pressure sensing means locatable at the second point and a processing means operable to receive raw data from the first and second pressure sensing means and to perform the steps of the method of the first, second or third aspects of the present invention.

The fourth aspect of the present invention may incorporate any or all features of the first, second and third aspects of the present invention as is desired or appropriate. In particular, it may include third pressure sensing means locatable at a third point and a fourth pressure sensing means locatable at a fourth point.

According to a fifth aspect of the present invention there is provided an apparatus suitable for performing the method of the first, second or third aspects of the present invention comprising: a conduit suitable for carrying fluid, a first pressure sensing means located at the first point, a second pressure sensing means located at the second point and a processing means operable to receive raw data from the first and second pressure sensing means and to perform the steps of the method of the first, second or third aspects of the present invention.

The fifth aspect of the present invention may incorporate any or all features of the first, second and third aspects of the present invention as is desired or appropriate. In particular, it may include third pressure sensing means located at the third point and a fourth pressure sensing means located at the fourth point.

According to a sixth aspect of the present invention there is provided a method of determining the speed of pressure waves propagating through a fluid flowing in a fluid carrying conduit comprising the steps of: monitoring the fluid flow in the fluid carrying conduit in accordance with the method of the first aspect of the present invention; analysing the two dimensional intensity function to produce a distribution which is related to the density of peaks as a function of the position variable; and analysing the distribution to determine the speed of the pressure waves.

The sixth aspect of the present invention may incorporate any or all features of the first, second and third aspects of the present invention as is desired or appropriate.

Typically, the two dimensional intensity function contains several, relatively small peaks at values of the position variable, p, which correspond to the first and second points along the conduit. As such, the density of peaks is typically largest for these at values of the position variable.

Since the position variable is defined in units of time, if the length of the conduit is known, by accurately determining the values of the position variable which correspond to the first and second points, the speed of propagation of pressure waves through the fluid may be deduced.

The speed of propagation of pressure waves through the fluid may be deduced by determining the value of the position variable which corresponds to the first point; by determining the value of the position variable which corresponds to the second point; or by determining both of these values.

Preferably the distribution is a histogram which is filled by making a list of peaks in the two dimensional intensity function; and determining the position value of each peak in the list and incrementing the value of the bin of the histogram within which that position value falls by one.

The list of peaks may comprise all peaks in the two dimensional intensity function. Alternatively, the list may comprise only those peaks which satisfy specific criteria. For example, the specific criteria may require that the height of the peaks be greater than some pre-set height threshold.

The bins of the histogram may be chosen to be of a suitable size so that substantially all of the peaks populating the region corresponding to the first point fall within one bin and that substantially all of the peaks populating the region corresponding to the second point fall within another bin. In this way, the position of each of the two points on the conduit will appear as a single bin tower in the distribution.

Alternatively, the bins of the histogram may be chosen to be sufficiently small that the peaks populating the region corresponding to the first point on the conduit are spread over a plurality of bins and the peaks populating the region corresponding to the second point on the conduit are spread over a different plurality of bins. In such embodiments the positions of the two points on the conduits will appear as peaks in the distribution. These peaks may or may not be normally distributed. The position of the first and second points may be found by fitting a suitable function, for example a Gaussian function, which corresponds to the shape of these peaks, to the distribution in order to find the maximum of these peaks.

In order that the invention can be more clearly understood it is now described further below with reference to the accompanying drawings, of which:

FIG. 1 shows a schematic overview of the structure of a monitored fluid conduit and an associated data processing system according to the present invention;

FIG. 2 shows an example of the output of two pressure sensors situated at different points on a fluid carrying pipe;

FIG. 3 shows the first and second quantities according to the first aspect of the present invention calculated by the first stage when the pressure data shown in FIG. 2 is input;

FIG. 4 shows a two dimensional representation of an intensity function according to the first aspect of the present invention;

FIG. 5 shows a slice of the intensity function of FIG. 4 through the line d-d', which corresponds to constant time;

FIG. 6 shows a 2 dimensional representation of the intensity function for the first and second quantities shown in FIG. 3;

FIG. 7 shows a 3 dimensional representation of the intensity function for the first and second quantities shown in FIG. 3;

FIG. 8 shows an intensity function according to the present invention with dotted lines corresponding to the first and second points on the conduit, at which the pressure is monitored substantially continuously, and the central region which these define;

FIG. 9 shows an intensity function calculated according to the present invention wherein a plurality of maxima is arranged in a substantially straight line; and FIG. 10 shows an arrangement of pressure sensors according to the present invention which is particularly favoured.

Figure 1:
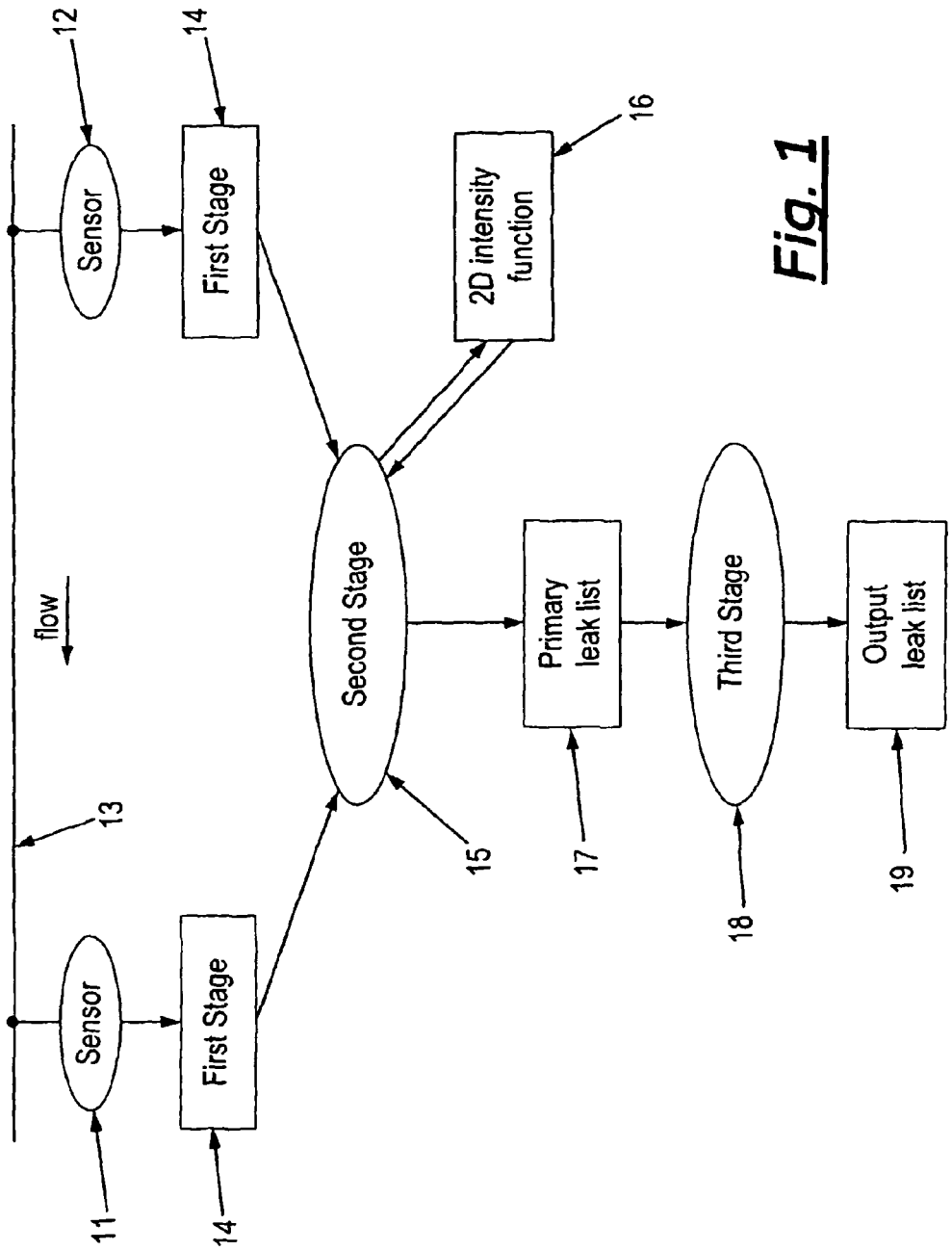
Referring to FIG. 1, a monitored fluid containing pipe 13 and an associated data processing system according to the present invention is shown. Two pressure sensors 11, 12 are disposed at two different points along a fluid carrying pipe 13, through which fluid is flowing to the left as indicated by the arrow. Each of the two pressure sensors 11, 12 is operable to monitor the fluid pressure at the point in the pipe at which it is disposed substantially continuously. Preferably, this raw data is sampled at a high rate, for example at a rate of the order of 100 Hz. Preferably, a pressure sensor which results in low noise is chosen. For example, for a plastic pipe carrying water, a PTX510 Druck sensor has been found to be adequate although different sensors may be necessary for different operating conditions.
Figure 2:
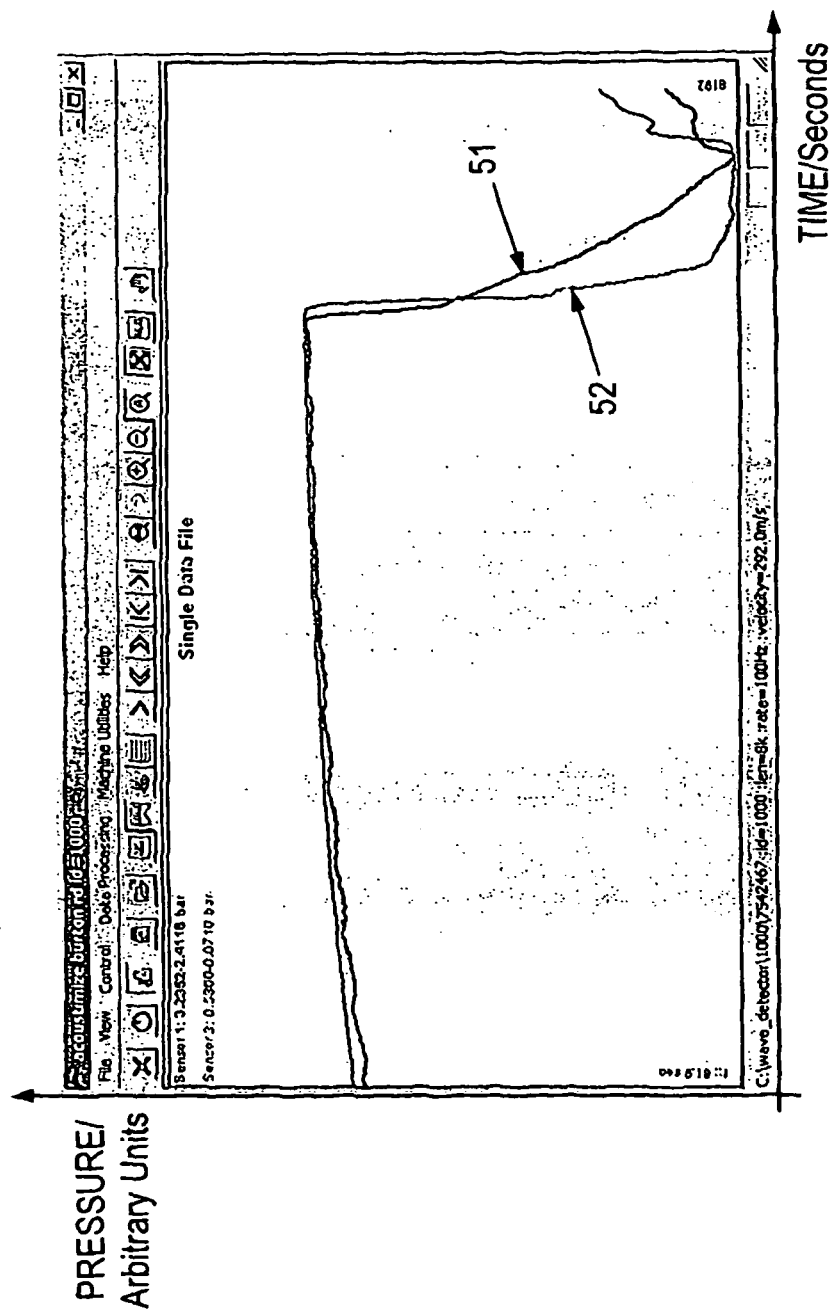

The output of the two pressure sensors 11, 12 is processed by a first stage 14 to determine first and second quantities associated with first and second pressure sensors 11, 12 respectively, which will be described in detail below. The first stage 14 creates an output for each of these two inputs and these determined first and second quantities are processed by a second stage 15, which will be described in detail below. The second stage 15 combines the two outputs from the first stage 14 to produce a two dimensional intensity function of time and a position variable 16. The intensity function 16 is then analysed to form a primary list of potential leak candidates 17. Finally, the intensity function 16 and the primary list of potential leak candidates 17 are analysed by a third stage 18 to produce an output list of leak candidates 19.

First Stage

The input to the first stage 14 is the pressure, as a function of time, as measured by one of the two sensors 11, 12. Since the arrival of a pressure wave front at a point on the pipe typically results in a maximum or minimum in the second differential of the pressure at that point with respect to time, the method of the present invention uses first and second quantities which are proportional to the second differential with respect to time of the pressure at the positions of the sensors. However, before these quantities are calculated, the raw data output from the two pressure sensors 11, 12 is smoothed in order to reduce the effects of noise resulting from turbulence in the fluid flow.

DETAILED DESCRIPTION

The second differential with respect to time of a function P(t) may be estimated by:

$$\frac{d^2 P}{dt^2}(t) \approx -\frac{1}{\varepsilon^2}\{2P(t) - P(t+\varepsilon) - P(t-\varepsilon)\}, \quad (2)$$

where $\varepsilon$ is a small time interval (the differential is formally defined by taking the limit $\varepsilon \to 0$). Since the method of the present invention essentially involves the combination of two like quantities from different points on the pipe, the normalisation is not important and, as such, it is essentially the quantity in parentheses, which is proportional to the second differential, which is used.

The smoothing performed is essentially a local time averaging although, as explained above the normalisation is unimportant. From each of the raw data sets output by the two pressure sensors 11, 12, a second data set is found, wherein a point in the second data set is proportional to the average of h corresponding data points in the raw data set. This second data set is substantially smoother than the raw data and is therefore a more suitable input to the numerical estimate algorithm. In a particularly preferred embodiment, the raw data is sampled at a high rate, for example at a rate of the order of 100 Hz. By choosing a high sampling rate for the raw data, the second data set retains adequate temporal resolution despite the averaging.

The first stage 14 performs the two steps of smoothing the raw data and calculating a quantity proportional to the second time derivative simultaneously. An element in the output data, $O_n$, is calculated from the input data points, $I_n$, as follows:

$$O_n = 2\sum_{i=n-h/2}^{i=n+h/2} I_i - \sum_{i=n-3h/2}^{i=n+h/2} I_i - \sum_{i=n+h/2}^{i=n+3h/2} I_i, \quad (3)$$

where h is a free parameter of the method. The optimum value of h should be chosen for the given running conditions.

Figure 3:
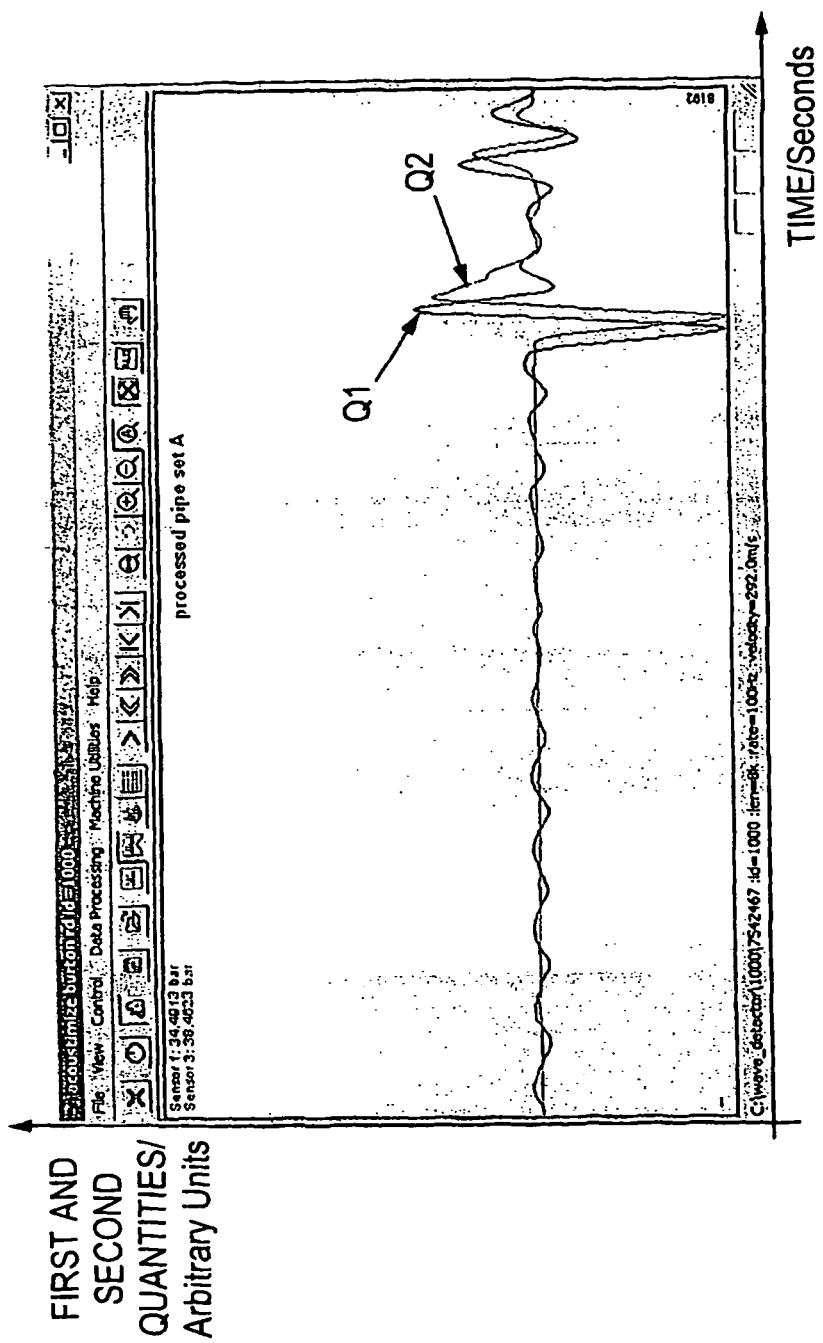
Figure 4:
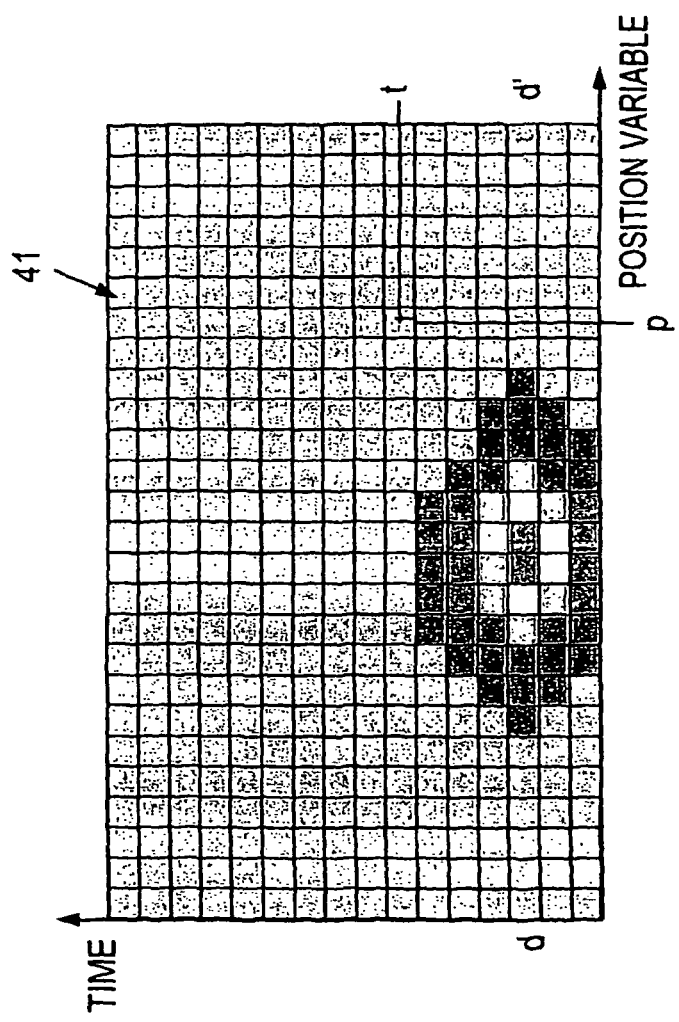

FIG. 3 shows an example of the outputs of two pressure sensors, 11, 12, showing the pressure as a function of time at two different points on a test rig; FIG. 4 shows the outputs from the first stage 14, i.e. the first and second quantities, A(t) and B(t), when this raw data is used as the input.

In an alternative embodiment of the present invention, an element in the output data, $O_n$, is calculated from the input data points, $I_n$, as follows:

$$O_n = \sum_{i=n-k}^{i=n+k} I_i - \sum_{i=n-2k}^{i=n-k} I_i - \sum_{i=n+k}^{i=n+2k} I_i, \quad (4)$$

where k is a free parameter of the method. The optimum value of k should be chosen for the given running conditions.

Second Stage

The second stage 15 combines the first and second quantities determined by the first stage 14 to produce a two dimensional intensity function 16 of time and a position variable. It is a function of time and the position variable, p, which is defined below.

The position variable which corresponds to the displacement of an arbitrary point on the conduit relative to an origin midway between the positions of the two sensors 11, 12 is defined. This position variable is converted into units of time using the speed of propagation of pressure waves through the fluid in the conduit. By doing this the position variable so formed, p, corresponds to the time of flight of a pressure wave from points on the conduit to the fixed origin point.

For given values of time, t, and position variable (in units of time), p, the intensity function is found by combining a region of the first quantity, A(t), centred on t+p with a region (of substantially the same size) of the second quantity, B(t), centred on t−p. Therefore, for a fixed value of time, t', the two regions considered are equidistant from that point on the time axis and are on opposite sides of that point. Increasing p simply increases the separation of the two regions considered. Similarly, for a fixed value of p, increasing t corresponds to shifting both of the two regions along the time axis in the direction of increasing time.

The size of the regions is chosen to be 2x, where x corresponds to a time greater than the time of flight of a pressure wave propagating from the first point on the conduit to the second point. As such, x is chosen to be approximately 125% of the time of flight of a pressure wave propagating from the first point on the conduit to the second point.

The intensity function is given by:

$$I(t, p) = \sum_{n=p-x}^{n=p+x} A(t-n)B(t+n), \quad (5)$$

where A and B are the first and second quantities respectively, t is the time and p is the position variable in units of time.

Figure 5:
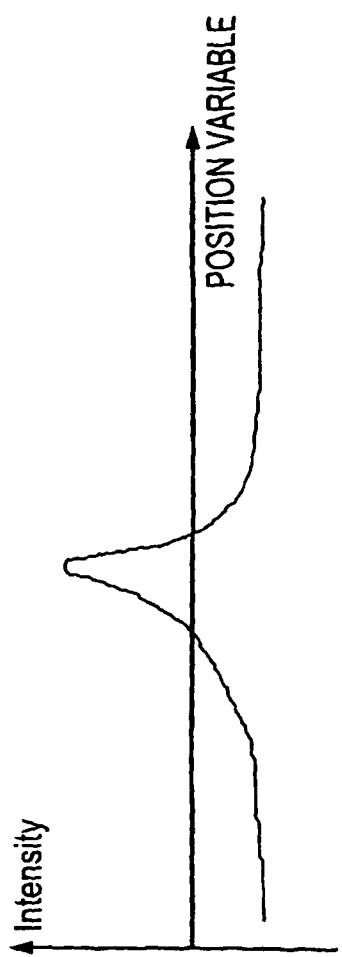

FIG. 4 shows a two dimensional representation of an intensity function according to the first aspect of the present invention. Each pixel 41 of the function is calculated using equation 4. FIG. 5 shows a slice of the intensity function of FIG. 4 through the line d-d', which corresponds to constant time.

Figure 6:
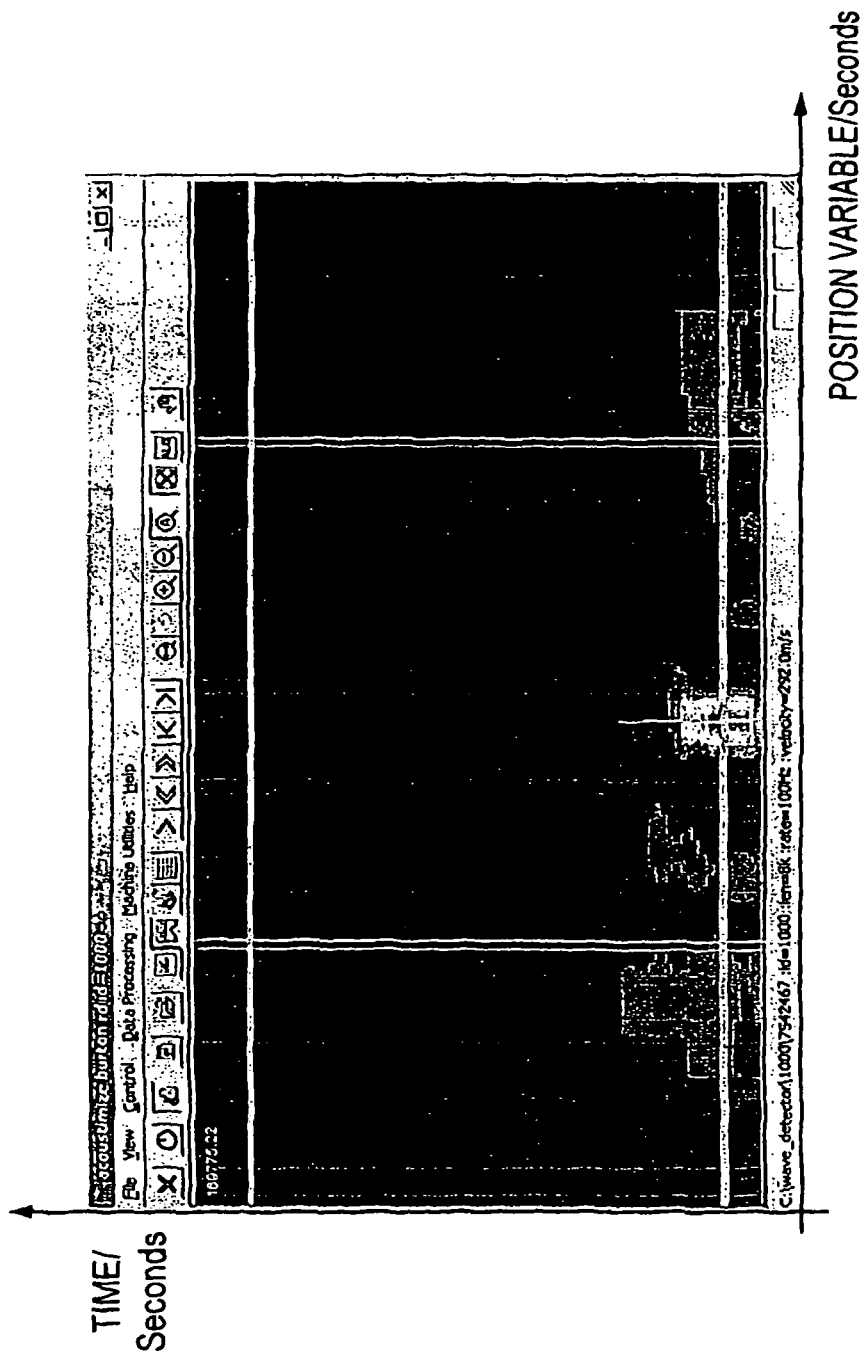
Figure 7:
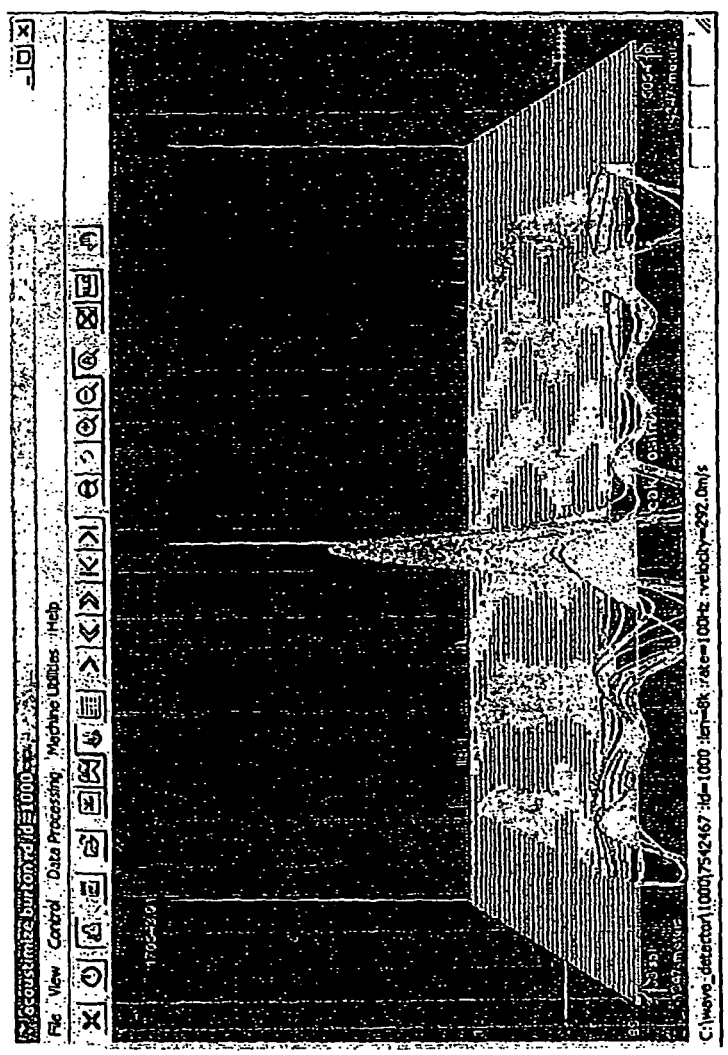

FIGS. 6 and 7 respectively show 2 dimensional and 3 dimensional representations of the intensity function for the first and second quantities shown in FIG. 3.

Third Stage

The intensity function defined by equation 4 essentially represents a substantially continuous probability function, wherein its absolute value is related to the probability of a leak having occurred. The intensity function is analysed by a third stage 18 to produce an output list of leak candidates 19.

As a first step, all local maxima in the intensity function are found and arranged in ascending order; each of these maxima may be a potential leak candidate. Next all leak candidates are compared with a pre-set threshold value; and all candidates corresponding to a maximum which is below the pre-set threshold are rejected.

All leak candidates which correspond to maxima which are close to a larger maximum; in this way for a cluster of adjacent maxima, only the largest is considered. Two maxima may be determined to be close if: (i) the temporal distance between them, i.e. the difference in their time values, is greater than a pre-set temporal threshold; (ii) the ratio of the smaller peak intensity to the larger peak intensity is greater than a pre-set intensity threshold; and (iii) the spatial distance between them, i.e. the difference in their position variable values, is smaller than a pre-set threshold.

Figure 8:
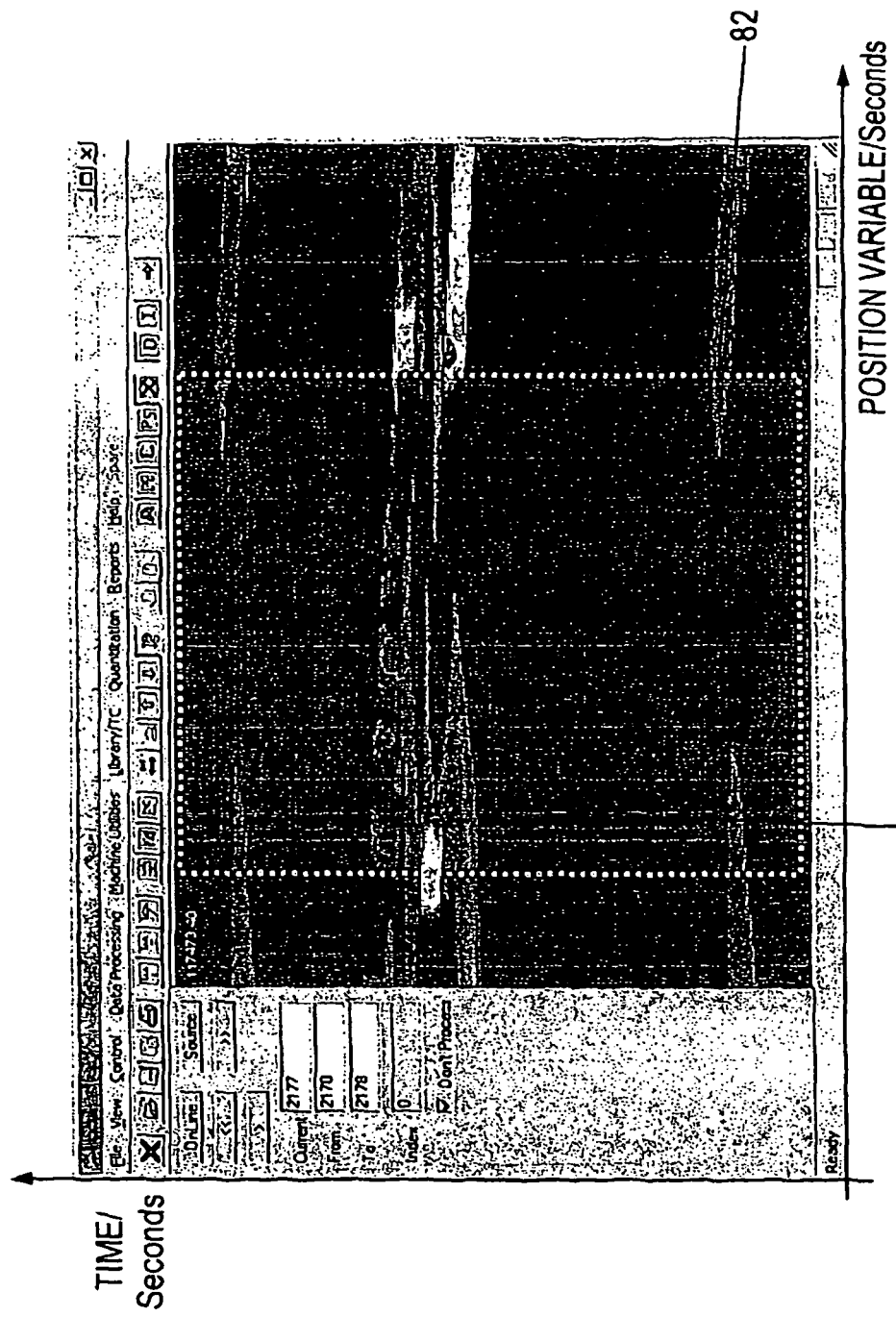

The first and second points on the conduit, at which the pressure is monitored substantially continuously, correspond to two lines in the t−p plane in which the intensity function is defined; and the central region between those lines corresponds to the continuum of points on the conduit between the first and second points. Referring to FIG. 8, the central region 81 is indicated by dotted lines 82. The method further comprises the step of rejecting any leak candidates which correspond to maxima lying outside of the central region. This is particularly advantageous as it leads to the rejection of transient waves propagating along the conduit. Therefore, any pressure wave whose source is not between the first and second points, for example as a result of the pipe receiving an external blow, will not lead to false determination of leaks in the conduit.

Figure 9:
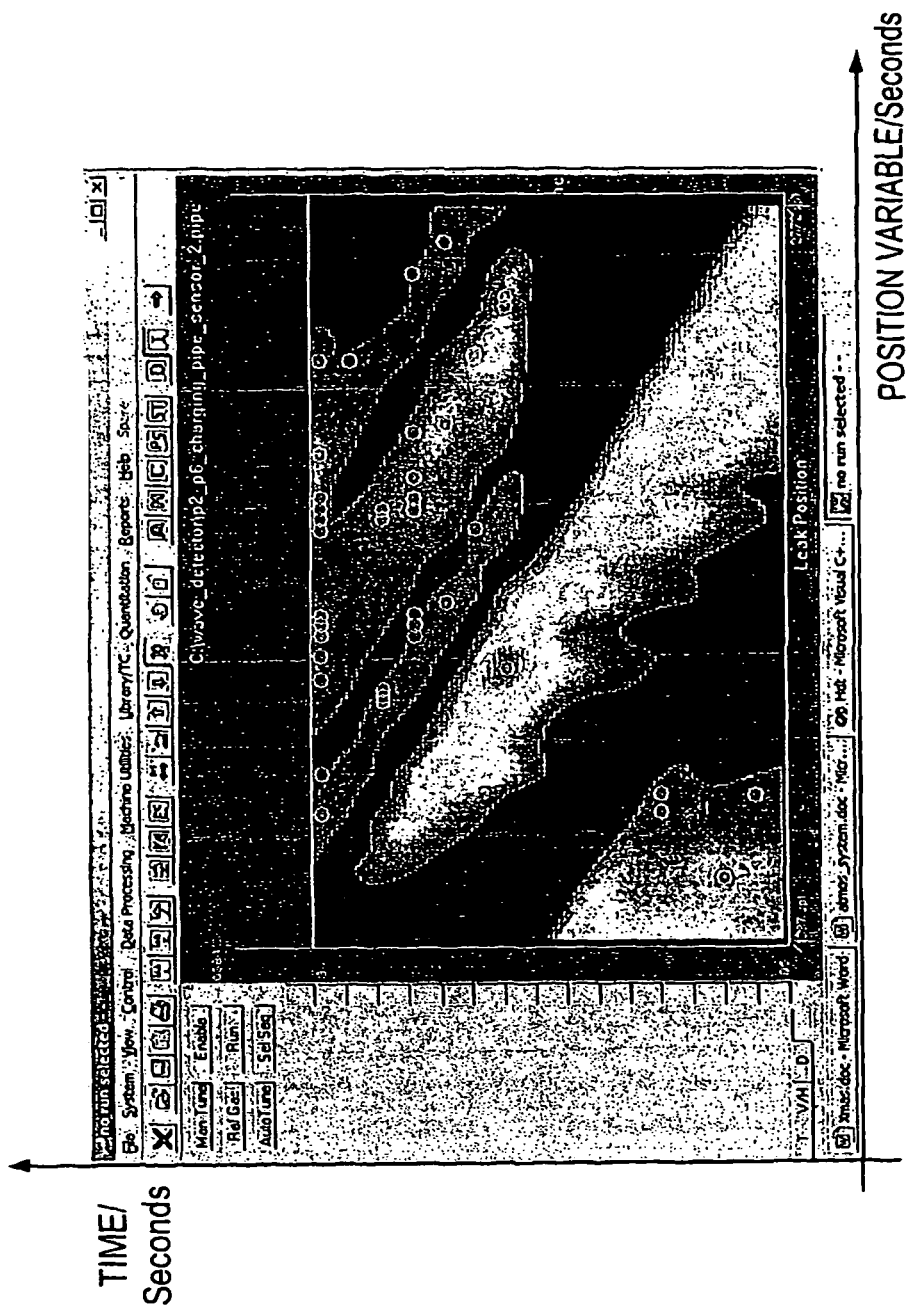

An additional rejection is applied to reject some or all of the leak candidates which correspond to maxima which are arranged in a substantially straight line in the t–p plane. This rejection may only be applied for arrangements wherein the absolute value of the gradient of the line is substantially the same as the speed of propagation of pressure waves through the fluid. This is particularly advantageous since it allows for rejection of large packing transient waves. Furthermore, it allows for a correct treatment of leaks occurring while the fluid pressure is altered externally. FIG. 9 shows an intensity function calculated according to the present invention wherein a plurality of maxima is arranged in a substantially straight line. This behaviour was caused by an external packing transient.

The method further comprises the step of determining the ratio of leak transients. If the transmission loss of the pipe is known then ghost peaks, which are generated as a result of leaks occurring concurrently with line packing, may be rejected.

The method further comprises the step of rejecting a group of candidates if they correspond to a group of maxima occurring at substantially the same time. Such rejection occurs only if the number of peaks occurring at substantially the same time is greater than a pre-determined value, which is a free parameter of the method. This is particularly advantageous because when the operational conditions of the fluid are altered substantially, false maxima, which do not correspond to leaks, may be generated. Typically these false maxima are generated at substantially the same time.

The above discussion relates to an embodiment of the present invention which employs a single pair of pressure sensing means, which has been shown to give good performance for determining and locating leaks in pipes. However, additional benefits can be derived by the use of a second pair of pressure sensing elements as discussed below.

FIG. 10 shows an arrangement of pressure sensors which is particularly favoured. In addition to the two pressure sensors 11, 12 already considered, an additional two sensors 103, 104 are disposed along fluid carrying pipe 13. The pressure sensors are arranged in pairs, with one pair 101 disposed proximate to one end of the pipe 13, separated by a small axial displacement and the other pair 102 disposed at the other end of the pipe 13 and also separated by a small axial displacement.

The output of the two pressure sensors 103 and 104 are also processed by the first stage 14 to determine third and fourth quantities associated with third and fourth pressure sensors 103, 104 respectively, as described in detail above. The first stage 14 creates an output for each of these two inputs and the determined third and fourth quantities are processed by the second stage 15, as described in detail above. The second stage 15 combines the two outputs from the first stage 14 to produce a two dimensional intensity function of time and a position variable 105. The intensity function 105 is then analysed to form a primary list of potential leak candidates 106. Finally, the intensity function 105 and the primary list of potential leak candidates 106 are analysed by the third stage 18 to produce an output list of leak candidates 107.

In embodiments comprising a second pair of pressure sensors, 103, 104, the method of the present invention further comprises the step of comparing the sets of leak candidates 19, 107 found by analysing the intensity function derived from the first and second quantities and the intensity function derived from the third and fourth quantities. Furthermore, the method of the second aspect of the present invention comprises the step of rejecting leak candidates 19 unless they are present in both the intensity function derived from the first and second quantities and the intensity function derived from the third and fourth quantities.

The method may further comprise the steps of: combining the first and third quantities to produce a two dimensional intensity function of time and a position variable, and analysing the intensity function to determine the direction of propagation of the pressure wave resulting in each leak candidate; and combining the second and fourth quantities to produce a two dimensional intensity function of time and a position variable, and analysing the intensity function to determine the direction of propagation of the pressure wave resulting in each leak candidate. For a leak occurring between the area within which the first and third points are located and the area within which the second and fourth points are located, the direction of the waves at these two areas should be opposite, whereas for a wave propagating along the entire conduit these directions should be the same. This may be used to further discriminate against transient waves propagating along the conduit.

It is particularly difficult to detect the presence of leaks in the case of multiphase flow along the conduit since the velocity of pressure wave propagation can vary by as much as 50%. For such systems, a preferred embodiment does not comprise the step of rejecting leak candidates which correspond to maxima which are close to a larger maximum but does comprise the above mentioned direction discrimination to distinguish between waves originating inside the region of interest and those originating outside. Although the determination of the position of any leaks may be poor, the leaks will nonetheless be detected.

It is of course to be understood that the invention is not to be restricted to the details of the above embodiments which have been described by way of example only.

What is claimed is:

1. A method of monitoring a fluid in a fluid carrying conduit comprising the steps of:
monitoring a fluid characteristic at a first point and second point along the conduit substantially continuously;
determining first and second quantities, being related to a differential with respect to time of the value of the fluid characteristic at the first and second points, respectively; combining the first and second quantities to produce a two dimensional intensity function of time and a position variable;
analysing a magnitude of the two dimensional intensity function of time to derive information relating to the fluid;
determining whether or not the magnitude of the two dimensional intensity function of time satisfies a pre-determined criteria, wherein if the two dimensional intensity function of time does satisfy the pre-determined criteria, a leak is determined to have occurred; and wherein, if a leak is found, the method further comprises the step of determining the location of a leak in the fluid carrying conduit by identifying the position of the leak by mapping the location of the region of the intensity function which satisfies the pre-determined criteria onto a corresponding position on the conduit.

2. A method as claimed in claim 1 wherein the fluid characteristic comprises either: the rate of fluid flow; or the fluid pressure.

3. A method as claimed in claim 2 wherein the first and second quantities are proportional to a second differential with respect to time of the fluid pressure at the first and second points, respectively.

4. A method as claimed in claim 3 wherein the second differential with respect to time of the fluid pressure at the first and second points are determined using a numerical estimate algorithm and wherein before the second differential with respect to time of the fluid pressure at the first and second points are determined using the numerical estimate algorithm the raw date is smoothed by performing a local time averaging.

5. A method as claimed in claim 1 wherein the position variable corresponds to the displacement of points on the conduit relative to a fixed origin point.

6. A method as claimed in claim 1 wherein for a fixed value of the time variable, t, and the position variable, p, the intensity function is found by combining a region of the first quantity centred on t+p with a region of the second quantity centred on t−p.

7. A method as claimed in claim 6 wherein the size of the regions is chosen to be greater than twice the time of flight of a pressure wave propagating from the first point on the conduit to the second point.

8. A method as claimed in claim 1 wherein the intensity function is given by:

$$I(t, p) = \sum_{n=p-x}^{n=p+x} A(t-n)B(t+n),$$

where A and B are the first and second quantities respectively, t is the time and p is the position variable in units of time.

9. A method as claimed in claim 1 wherein the method further comprises the steps of: monitoring the fluid characteristic at a third point and fourth point along the conduit substantially continuously; determining third and fourth quantities, being related to a differential with respect to time of the fluid characteristic at the third and fourth points respectively; combining the third and fourth quantities to produce a two dimensional intensity function of time and a position variable, and analysing the magnitude of the intensity function to derive information relating to the fluid flow.

10. A method as claimed in claim 1 wherein the pre-determined criteria comprise requiring a local minimum or maximum of the intensity function and identifying such maxima or minima as leak candidates.

11. A method as claimed in claim 10 the method further comprises the step of rejecting all leak candidates which satisfy one or more of the following criteria:
a. the leak candidate corresponds to a maximum which is below a pre-set threshold;
b. the leak candidate corresponds to maxima which is close to a larger maximum;
c. the leak candidate corresponds to maxima lying outside of a central region defined by the first and second positions;
d. the leak candidate corresponds to one of a plurality of maxima which are arranged in a straight line in the t–p plane;
e. the leak candidate corresponds to a ghost peak, which is generated as a result of leaks occurring concurrently with line packing; and/or
f. the leak candidate corresponds to one of a group of maxima occurring at substantially the same time.

12. A method as claimed in claim 1 further comprising the step of: requiring the ratio of $I_1 \times L_1$ to $I_2 \times L_2$ to be approximately 1, where $I_1$ and $I_2$, are maxima in the first and second quantities respectively, and $L_1$ and $L_2$ are the distances from the peak candidate position to the first and second positions respectively.

13. A method as claimed in claim 10 wherein the method further comprises the step of comparing the sets of leak candidates found by analysing the intensity function derived from the first and second quantities and the intensity function derived from the third and fourth quantities and rejecting leak candidates that are not present in both the intensity function derived from the first and second quantities and the intensity function derived from the third and fourth quantities.

14. A method as claimed claim 10 wherein the method further comprises the steps of: combining the first and third quantities to produce a two dimensional intensity function of time and a position variable, and analysing the intensity function to determine the direction of propagation of the pressure wave resulting in each leak candidate; combining the second and fourth quantities to produce a two dimensional intensity function of time and a position variable, and analysing the intensity function to determine the direction of propagation of the pressure wave resulting in each leak candidate; and rejecting leak candidates for which the direction of propagation of the pressure wave is the same at both ends of the conduit.

15. A method as claimed in claim 10 wherein the method comprises the step of summing all peak candidates which correspond to the same position on the conduit over an extended time period.

16. A method as claimed in claim 1, further comprising the step of determining the speed of pressure waves propagating through the fluid flowing in the fluid carrying conduit by analysing the two dimensional intensity function to produce a distribution which is related to the density of peaks as a function of the position variable; and analysing said distribution to determine the speed of the pressure waves.

17. A method as claimed in claim 16 wherein the speed of propagation of pressure waves through the fluid is deduced by determining the value of the position variable which corresponds to the first point; determining the value of the position variable which corresponds to the second point; or by determining both of these values.

18. An apparatus suitable for performing a method as claimed in claim 1 comprising: a first sensing means locatable at the first point, a second sensing means locatable at the second point and a processing means operable to receive raw data from the first and second sensing means and to perform the steps of the method.

* * * * *